(12) United States Patent
Jhang et al.

(10) Patent No.: US 10,895,943 B2
(45) Date of Patent: Jan. 19, 2021

(54) DISPLAY MODULE WITH TOUCH FUNCTION

(71) Applicant: WiseChip Semiconductor Inc, Miaoli County (TW)

(72) Inventors: You Hong Jhang, Miaoli County (TW); Shih Hong Jhang, Miaoli County (TW)

(73) Assignee: WISECHIP SEMICONDUCTOR INC, Miaoli County (TW)

( * ) Notice: Subject to any disclaimer, the term of this patent is extended or adjusted under 35 U.S.C. 154(b) by 0 days.

(21) Appl. No.: 16/654,403

(22) Filed: Oct. 16, 2019

(65) Prior Publication Data

US 2020/0371639 A1 Nov. 26, 2020

(30) Foreign Application Priority Data

May 24, 2019 (TW) .............................. 108117998 A

(51) Int. Cl.
*G06F 3/041* (2006.01)
*G06F 3/044* (2006.01)
*G09G 3/3216* (2016.01)

(52) U.S. Cl.
CPC .......... *G06F 3/0443* (2019.05); *G06F 3/0412* (2013.01); *G09G 3/3216* (2013.01)

(58) Field of Classification Search
CPC .... G06F 3/0443; G06F 3/0412; G06F 3/0445; G06F 3/041662; G06F 3/0416; G06F 3/041
See application file for complete search history.

(56) References Cited

U.S. PATENT DOCUMENTS

2017/0363191 A1* 12/2017 Hess ........................ F16H 45/02
2018/0039352 A1*  2/2018 Wu ......................... G06F 3/0443
2019/0121180 A1*  4/2019 Ohashi .................. G02F 1/1337

* cited by examiner

*Primary Examiner* — Dennis P Joseph
(74) *Attorney, Agent, or Firm* — Muncy, Geissler, Olds & Lowe, P.C.

(57) ABSTRACT

The present invention provides a display module with touch function, including: a touch display panel and a control chip. The touch display panel contains a display area and non-display area around the display area. The display area contains a first sensing electrode constituted by a pixel electrode layer. The non-display area contains two second sensing electrodes. The control chip electrically connects with the first sensing electrode and the two second sensing electrodes separately through wires. The first sensing electrode and the second sensing electrode are self-capacitance sensing electrode. The control chip is used to read the self-capacitance variation of the first sensing electrode and the two second sensing electrodes for outputting a touch signal.

11 Claims, 8 Drawing Sheets

DISPLAY MODULE WITH TOUCH FUNCTION

FIELD OF THE INVENTION

The present invention relates to a display module with touch function, more particularly to an organic light emitting diode display module with touch function.

BACKGROUND OF THE INVENTION

The organic light emitting diode has been widely applied in portable electronic device, such as game console, cell phone, personal digital assistant (PDA) or smart bracelet etc.

Generally, the organic light emitting diode display module can be divided into a top emission type, a bottom emission type and a transmitting light-emitting type, according to the light emitting type. In addition, the touch panel module can also be classified into a resistive touch type, a capacitive touch type and an optical touch type. Since the capacitive touch has advantages of fast response time, long life-time and others advantages, the existing portable electronic device normally utilizes the capacitive touch.

In prior arts, if a passive matrix organic light emitting diode display module with touch function is to be made, a touch sensing layer may be added on the substrate or the cover of the display panel, or additional touch sensing circuit may be added in the display area to generate the touch function. However, the addition of the touch sensing layer may increase the whole volume or the thickness of the display module with touch function. On the other hand, the addition of touch sensing circuit on the display area will increase the complexity of the production of the display module with touch function to decrease the yield rate of the display module with touch function.

Thus, how to reduce the volume or the thickness of the display module with touch function and manufacture display module with touch function without disposing an additional touch sensing circuits in the display area, and to have the display module with touch function detect and output an one-dimensional or a two-dimensional touch signal is the technical problem to be solved in this invention.

SUMMARY OF THE INVENTION

An object of the present invention is to provide a thin type display module with touch function, which uses the organic light emitting diode display device and auxiliary sensing electrode to detect and output an one-dimensional or a two-dimensional touch signal. In addition, the thin type display module with touch function can be easily applied in various portable electronic devices.

In order to achieve above object, the present invention provides a display module with touch function, comprising: a touch display panel, including:

a display area having a passive matrix organic light emitting diode display device, wherein the passive matrix organic light emitting diode display device includes a first pixel electrode layer, a second pixel electrode layer and an organic light emitting material layer disposed between the first pixel electrode layer and the second pixel electrode layer, wherein either the first pixel electrode layer or the second pixel electrode layer is served as the first sensing electrode; and a non-display area surrounding the display area and having two second sensing electrodes; and a control chip is electrically connecting to the passive matrix organic light emitting diode display device and the two second sensing electrodes respectively, wherein the first sensing electrode and the two second sensing electrodes are self-capacitance sensing electrodes, and the control chip is used to read the variation of the capacitance of the first sensing electrode and the second sensing electrodes to output the touch signal.

In the above preferred embodiment, the touch panel includes a substrate and a cap. The substrate has a first surface and an opposing second surface. The cap has a third surface and an opposing fourth surface. The second surface is opposite to the third surface. The first pixel electrode layer, the organic light emitting layer and the second pixel electrode layer are sequentially stacked on the second surface.

In the above preferred embodiment, the two second sensing electrodes are disposed on the second surface.

In the above preferred embodiment, the two second sensing electrodes are disposed on the third surface.

In the above preferred embodiment, the display module with touch function further includes an insulating layer. The insulating layer is disposed on the second surface of the non-display area, and the two second sensing electrodes are disposed upon the insulating layer individually.

In the above preferred embodiment, the control chip is disposed on the second surface or on the third surface.

In the above preferred embodiment, the substrate is a transparent substrate and the first pixel electrode layer is a transparent electrode.

In the above preferred embodiment, the cap is a transparent glass and the second pixel electrode is a transparent electrode.

In the above preferred embodiment, the display module with touch function further includes an circuit board. The control chip is disposed on the circuit board, and the circuit board is electrically connected to the conductive wire of the touch panel so as to have the control chip respectively electrically connected to the passive matrix organic light emitting organic display device and the two second sensing electrodes.

In the above preferred embodiment, the control chip is used to control the electricity of the first sensing electrode to be switched between the touch on mode or the display on mode.

In the above preferred embodiment, the control chip is used to control the electricity of the two second individual sensing electrodes to be switched between the touch on mode or the touch off mode.

DETAILED DESCRIPTION OF THE PREFERRED EMBODIMENT

The advantages and characteristics of the present invention and the way to achieve the goal of the present invention will be easily understood by referring to the exemplary embodiments and the drawings. However, the present invention can be embodied by different forms and should not be understood that the embodiments herein are limited to the present invention. On the contrary, for persons ordinarily skilled in the art, the provided embodiments will express the scope of the present invention more thoroughly, more wholly and more completely.

Figure 1:
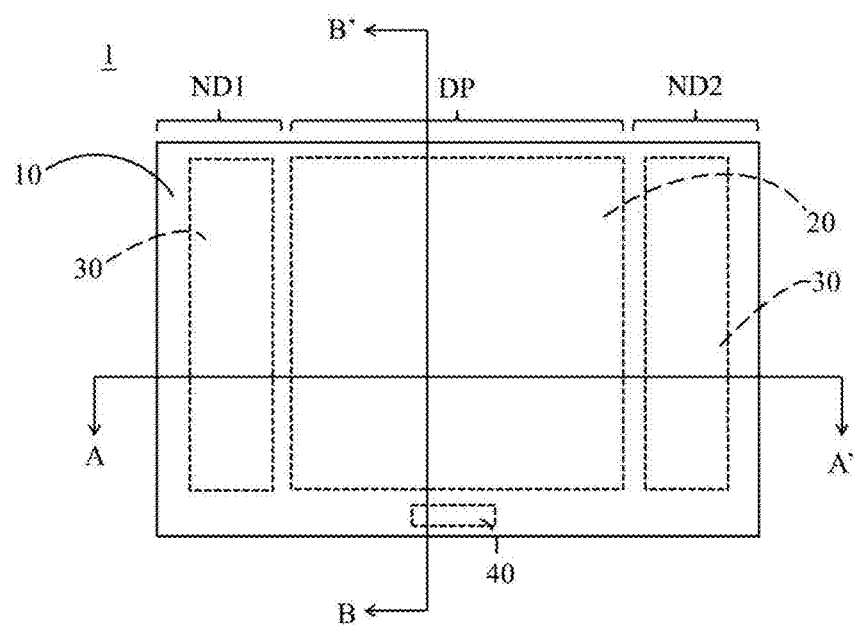
FIG. 1 is a top view of the display module with touch function in accordance with the present invention.

First, please refer to FIG. 1. FIG. 1 is a top view of the display module with touch function in accordance with the present invention. In FIG. 1, the display module with touch function 1 includes a touch panel 10, a passive matrix organic light emitting diode display device 20, a second sensing electrode 30, and a control chip 40. The touch panel 10 has a display area DP and non-display areas ND1, ND2 surrounding the display area DP. The passive matrix organic light emitting diode display device 20 is disposed in the display area DP. The two second sensing electrodes 30 served as auxiliary touch electrodes are disposed in the non-display areas ND1 and ND2, respectively, and located on the two opposite sides of the passive matrix organic light emitting diode display 20. The control chip 40 is disposed nearby the passive matrix organic light emitting diode display device 20, and is respectively connected to the passive matrix organic light emitting diode display device 20 and the second sensing electrode 30 by a conductive wire (not shown). The control chip 40 of the present invention is able to drive the passive matrix organic light emitting diode display device 20 to be switched between the touch on mode and the display on mode, to equip the organic light emitting diode display device 20 with the display function and touch function simultaneously.

Figure 2A:
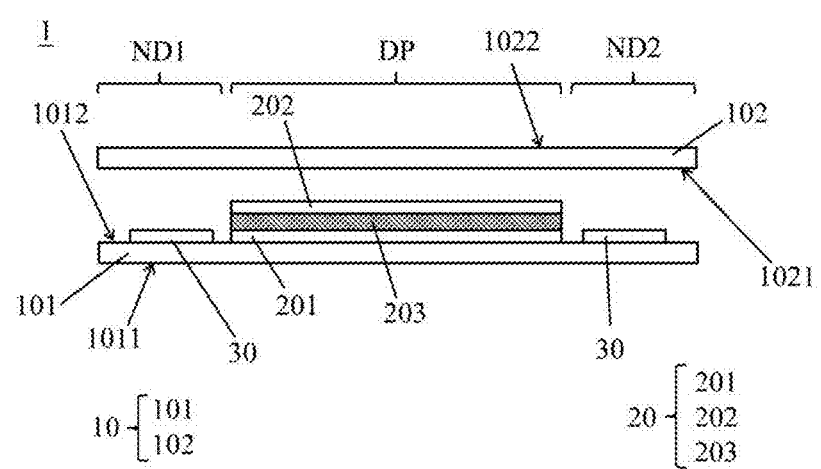
FIG. 2A is a cross-sectional view taken along line A-A' of the display module with touch function of FIG. 1 and indicates a first embodiment.

Please continue to refer to FIG. 1 and FIG. 2A. FIG. 2A is a cross-sectional view taken along line A-A' of the display module with touch function of FIG. 1 and indicates a first embodiment. In FIG. 2A, the touch panel 10 includes a substrate 101 and a cap 102. The substrate 101 has a first surface 1011 and an opposing second surface 1012. The cap 102 has a third surface 1021 and an opposing fourth surface 1022, and the second surface 1012 is opposite to the third surface 1021. The passive matrix organic light emitting diode display device 20 includes a first pixel electrode layer 201, a second pixel electrode layer 202 and an organic light emitting material layer 203, wherein the first pixel electrode layer 201, the second pixel electrode layer 202 and the organic light emitting material layer 203 are sequentially stacked on the second surface 1012. The first pixel electrode layer 201 includes a plurality of first pixel electrode used as a cathode electrode of the touch display panel (not shown). The organic light emitting material layer 203 includes a plurality of light emitting material (not shown). The second pixel electrode layer 202 includes a plurality of second pixel electrode used as a anode electrode of the touch display panel (not shown), wherein the pixel electrodes and the light emitting material can form a plurality pixel units by the insulating layers (not shown) and the separation units (not shown), and the control chip 40 is electrically connected to each of pixel electrodes in the first pixel electrode layer 201 and the second pixel electrode layer 202 by the plurality of the conductive wires (not shown). The processing of the passive matrix organic light emitting diode display device 20 in the present invention is well known by persons skilled in the art, so it will not be described in detail herein.

The second sensing electrode 30 can be formed on the second surface 1012 in the non-display areas ND1, ND2, when the first pixel electrode layer 201 is being formed at the same processing. In this embodiment, the substrate 101 of the display module with touch function 1 is a transparent substrate, the first pixel electrode layer 201 is a transparent electrode layer, and the light emitting type of the display module with touch function 1 uses the bottom light emitting type to display images. In another embodiment, the cap 102 of the display module with touch function 1 is a transparent glass, the second pixel electrode layer 202 is a transparent electrode layer, and the light emitting type of the display module with touch function 1 uses the top light emitting type to display images. The transparent electrode layer is consist of transparent conductive oxide (TCO) such as Indium Tin Oxide (ITO), Indium Zinc Oxide (IZO), Zinc Oxide (ZnO) or Tin oxide $SnO_2$. In other embodiments, both the substrate 101 and the cap 102 are transparent, and both the first pixel electrode layer 201 and the second pixel electrode layer 202 are transparent so as to achieve a mode simultaneously including the top light emitting type and the bottom light emitting type to display images.

Please continue to refer to FIG. 1 and FIG. 2A. The control chip 40 can select one of either the first pixel electrode layer 201 or the second pixel electrode layer 202 to be a first sensing electrode. In this embodiment, the first pixel electrode layer 201or the second pixel electrode layer 202 served as the first sensing electrode and the second sensing electrode 30 are self-capacitance sensing electrode. The control chip 40 is used to read the variation of the self-capacitance of first sensing electrode ((the first pixel electrode layer 201 or the second pixel electrode layer 202 can be regarded as the first sensing electrode) and the second sensing electrode 30. For example, when the users' fingers touch the first surface 1011 or the fourth surface 1022 and then slide on the first surface 1011 or the fourth surface 1022, the first sensing electrode (the first pixel electrode layer 201 or the second pixel electrode layer 202) and the second sensing electrode 30 will detect the tracks where the finger has gone through and a capacitance variation is generated. The control chip 40 is used to read the self-capacitance variation of the first sensing electrode (the first pixel electrode layer 201 or the second pixel electrode layer 202) and the second sensing electrode 30 to further output the touch signal.

Figure 2B:
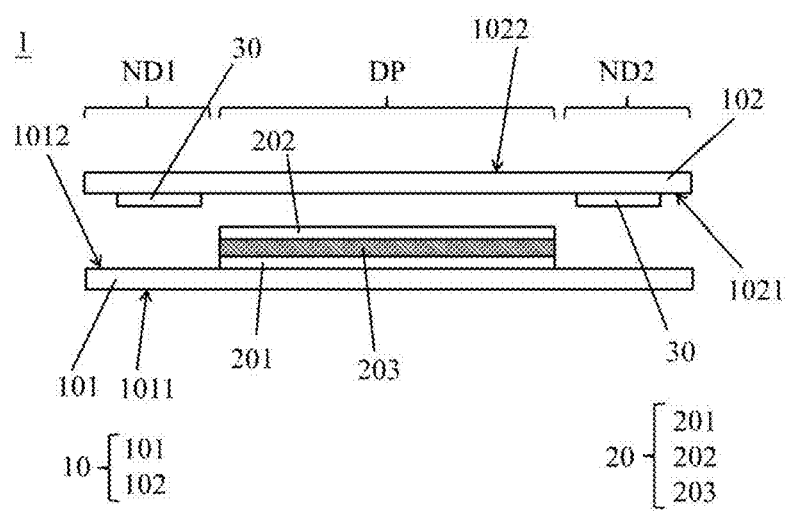
FIG. 2B is a cross-sectional view taken along line A-A' of the display module with touch function of FIG. 1 and indicates a second embodiment.

Please continue to refer to FIG. 2B, FIG. 2B is a second embodiment which illustrates the cross-sectional view taken along the line A-A' of the display module with touch function of FIG. 1. The functions of each device in FIG. 2B are the same as those in FIG. 2A, which are not to be explained herein. The difference between FIG. 2A and FIG. 2B is that the second sensing electrode 30 is formed on the third surface 1021 in the non-display areas ND1, ND2.

Figure 2C:
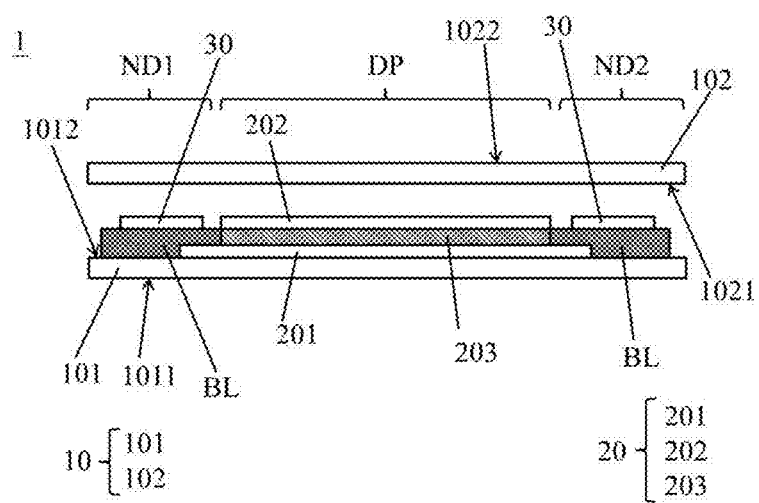
FIG. 2C is a cross-sectional view taken along line A-A' of the display module with touch function of FIG. 1 and indicates a third embodiment.

Please continue to refer to FIG. 2C. FIG. 2C is a third embodiment which illustrates the cross-sectional view taken along the line A-A' of the display module with touch function of FIG. 1. The functions of each device in FIG. 2C are the same as those in FIG. 2A, which are not to be explained herein. The difference between FIG. 2C and FIG. 2A is that two sides of the first pixel electrode layer 201 extend to the second surface 1012 of the non-display areas ND1, ND2, and there is an insulating layer BL extended from the display area DP covered above the first pixel electrode layer 201 of the non-display areas ND1, ND2. When the second pixel electrode layer 202 is formed, the second sensing electrode 30 could be formed on the insulating layer BL of the non-display areas ND1, ND2 simultaneously. The insulating layer BL is used for separating the first pixel electrode layer 201 and the second sensing electrode 30. The material of the insulating layer BL may be Polyimide PI.

Figure 3A:
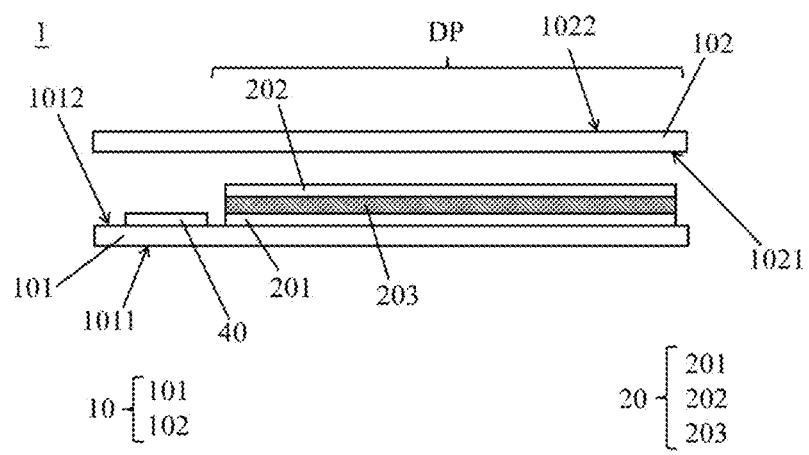
FIG. 3A is a cross-sectional view taken along line B-B' of the display module with touch function of FIG. 1 and indicates a fourth embodiment.
Figure 3B:
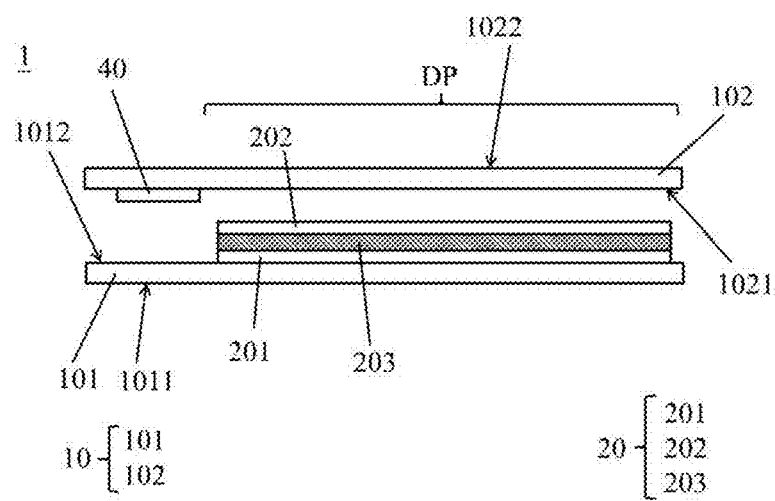
FIG. 3B is a cross-sectional view taken along line B-B' of the display module with touch function of FIG. 1 and indicates a fifth embodiment.
Figure 4:
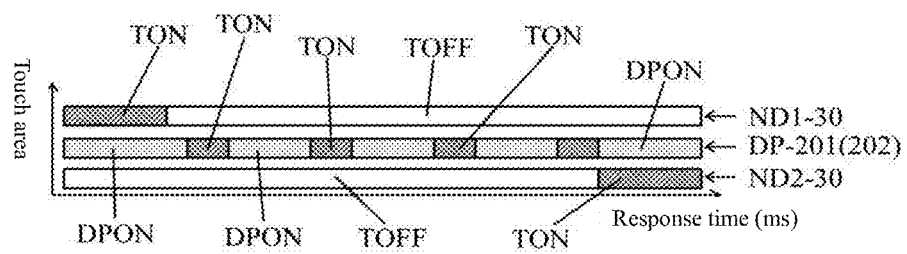
FIG. 4 is a schematic diagram showing the switching operation of the electricity of the sensing electrodes in accordance with the present invention.

Please refer to FIG. 3A and FIG. 3B. FIG. 3A is a fourth embodiment which illustrates the cross-sectional view taken along the line B-B' of the display module with touch function of FIG. 1. FIG. 3B is a fifth embodiment which illustrates the cross-sectional view taken along the line B-B' of the display module with touch function of FIG. 1. In FIG. 3A, the control chip 40 is disposed on the second surface 1012. In FIG. 3B, the control chip 40 is disposed on the third surface 1021. Although the present invention merely provides the embodiments showing the control chip 40 disposed on the second surface 1012 or the third surface 1021 under the passive matrix organic light emitting diode display device 20, in the actual application, the control chip 40 may be disposed on any locations in the non-display areas ND1, ND2. The present invention is not limited thereof Please together refer to FIG. 1, FIG. 2A and FIG. 4. FIG. 4 is a schematic configuration that shows the switching mode of the sensing electrode. In FIG. 4, the horizontal axis presents the time flow, and the unit is millisecond (ms). The vertical axis presents the operation conditions, wherein ND1-30 stands for the second sensing electrode 30 in the non-display area ND1; DP-201(202) stands for the first pixel electrode layer 201 or the second pixel electrode layer 202 served as the first sensing electrode in the display area DP; and ND2-30 stands for the second sensing electrode 30 in the non-display area ND2. TON means that the touch mode of the sensing electrode (first/second) has been turned on. TOFF means that the touch mode of the sensing electrode (first/second) has been turned off DPON means that display mode of the sensing electrode (either 201 or 202) has been turned on. The control chip 40 (as shown in FIG. 1) is used for controlling the first sensing electrode (the first pixel electrode layer 201 or the second pixel electrode layer 202) to be switched between the touch on mode TON and the display on mode DPON, and also used for controlling the second sensing electrode 30 to be switched between the touch on mode TON and the touch off mode TOFF.

In this embodiment, the response time of the touch on mode, TON of the first sensing electrode (the first pixel electrode layer 201 or the second pixel electrode layer 202) is between 1 ms and 1.67 ms. Since the response time of the touch on mode TON of the first sensing electrode is shorter enough and the perception of the people received from the display of the touch display panel 1 would not be affected during touch on mode TON. The response time of the touch on mode TON of the second sensing electrode 30 is between 8.3 ms to 16.67 ms. A further explanation which has to be made is that since the second sensing electrode 30 does not need to control the display, the touch on mode TON of the second sensing electrode 30 can be switched to a full time on mode. Alternatively, the response time of the second sensing electrode 30 can be set between 8.3 ms to 16.67 ms to save power and improve the time efficiency of the electronic device. For a real application, the setting of the response time of the second sensing electrode 30 is not limited by the embodiment.

Please together refer to FIG. 4 and table 1 as below. Table 1 is a look-up table of the touch signal on the one-dimensional direction in which the control chip 40 reads the variations of the self-capacitance of the first sensing electrode (the first pixel electrode layer 201 or the second pixel electrode layer 202) and the second sensing electrode 30.

TABLE 1

| Touch signal output | Gesture detection |
| --- | --- |
| Rightward Direction | ND1-30 to DP-201(202) to ND2-30 |
| Rightward Direction | ND1-30 to DP-201(202) |
| Rightward Direction | DP-201(202) to ND2-30 |
| Leftward Direction | ND2-30 to DP-201(202) to ND1-30 |
| Leftward Direction | ND2-30 to DP-201(202) |
| Leftward Direction | DP-201(202) to ND1-30 |

Figure 5:
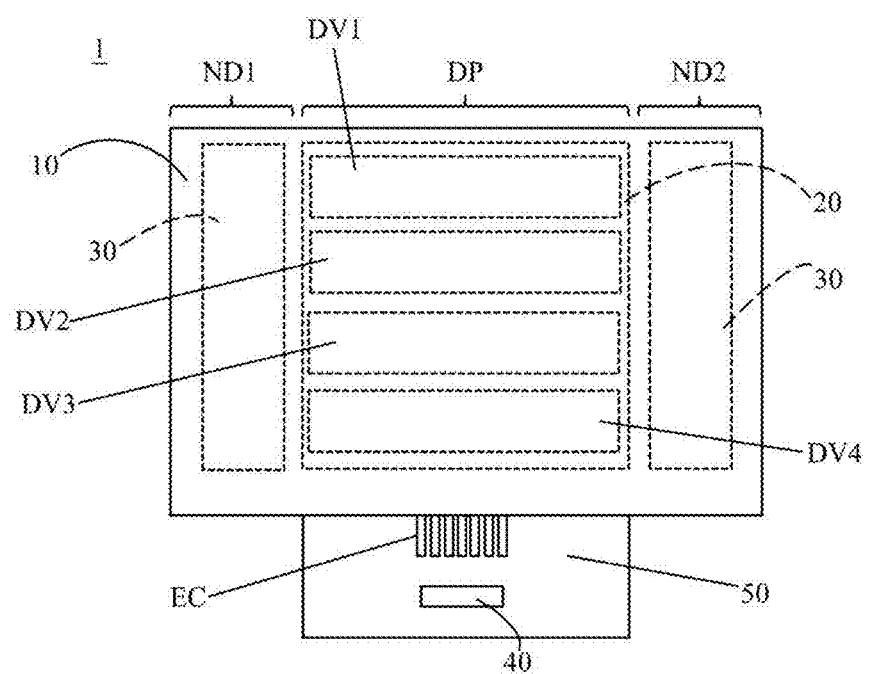
FIG. 5 is a top view of the display module with touch function of a sixth embodiment.

Please refer to FIG. 5. FIG. 5 is a sixth embodiment which illustrates the top view of the display module with touch function in accordance with the present invention. In FIG. 5, each function of the devices is the same as that in FIG. 1, which are not to be explained herein. The difference is that the first sensing electrode is only made of the first pixel electrode layer 201 or the second pixel electrode layer 202 of the passive organic light emitting display device 20 (as shown in FIG. 2A). In FIG. 5, through the setting of the control chip 40,one of the first pixel electrode layer 201 or the second pixel electrode layer 202 of the passive matrix organic light emitting diode display device 20 may be further divided into a plurality of first sensing electrodes, that are DV1, DV2, DV3 and DV4, Each of the first sensing electrodes DV1, DV2, DV3 and DV4 are parallel to each other and perpendicular to the second sensing electrode 30 of the non-display area ND1 and the second sensing electrode 30 of the non-display area ND2. Thus, those upward or downward touch signals may be obtained by the touch sequence of first sensing electrodes DV1, DV2, DV3 and DV4 to determine the vertical gesture on the display area DP. With the second sensing electrode 30, those rightward, leftward, upward and downward signals obtained by the display module with touch function 1 could achieve a two-dimensional gesture function.

Please continue to refer to FIG. 5. In this embodiment, in order to reduce complexity among the control chip 40, the conductive wires of the second sensing electrode 30 and the passive matrix organic light emitting display device 20 and to avoid noise affection, the control chip 40 may be alternatively disposed on the circuit board 50 and the control chip 40 can be electrically connected to the conductive wire of the touch panel 10 by using the electrically conducting terminal EC to make the control chip 40 respectively electrically connect to the passive matrix organic light emitting diode display device 20 and the second sensing electrode 30.

In comparison with the prior arts, the present invention utilizes the first pixel electrode layer or the second pixel electrode layer of the passive matrix organic light emitting diode display device to be served as the first sensing electrode, so that the additional touch sensing circuits are not needed in the display area. The first sensing electrode disposed in the display area and the second sensing electrode in the non-display area for auxiliary touch are both self-capacitance sensing electrodes to have the display module with touch function be able to detect and output the one-dimensional or two-dimensional touch signal. In addition, since the circuit configuration of the self-capacitance sensing electrode is simpler and could also reduce the volume of the display module with touch function or the thickness thereof, so that the thin-type display module with touch function can be easily applied in many various portable electronic devices. Therefore, the present invention is exactly a valuable masterpiece in the industry.

The present invention could be modified by persons skilled in the arts, but the scope of the claims of the invention is still protected.

What is claimed is:

1. A display module with touch function, comprising:
   a touch display panel, including:
   a display area, having a passive matrix organic light emitting diode display device, the passive matrix organic light emitting diode display device including a first pixel electrode layer, a second pixel electrode layer and an organic light emitting material layer disposed between the first pixel electrode layer and the second pixel electrode layer, wherein one of the first pixel electrode layer and the second pixel electrode layer is served as at least one first sensing electrode; and
   a non-display area, surrounding the display area, having at least two second sensing electrodes; and
   a control chip, the control chip is provided for electrically connecting to the passive matrix organic light emitting diode display device and the at least two second sensing electrodes through conductive wires respectively,
   wherein the at least one first sensing electrode and the at least two second sensing electrodes are self-capacitance sensing electrodes, and the control chip is used to read the variation of the self-capacitances of the at least one first sensing electrode and the at least two second sensing electrodes respectively for outputting a touch signal.

2. The display module with touch function of claim 1, wherein the touch panel further includes a substrate and a cap, wherein the substrate has a first surface and an opposing second surface, the cap having a third surface and an opposing fourth surface, wherein the second surface is opposite to the third surface, and the first pixel electrode layer, the organic light emitting material layer and the second pixel electrode layer are sequentially stacked on the second surface.

3. The display module with touch function of claim 2, wherein the at least two second sensing electrodes are disposed on the second surface.

4. The display module with touch function of claim 2, wherein the at least two second sensing electrodes are disposed on the third surface.

5. The display module with touch function of claim 2, wherein the display module with touch function further includes an insulating layer, the insulating layer disposed on the second surface of the non-display area, and the at least two second sensing electrodes disposed on the insulating layer.

6. The display module with touch function of claim 2, wherein the control chip is disposed on the second surface or the third surface.

7. The display module with touch function of claim 2, wherein the substrate is a transparent substrate and the first pixel electrode layer is a transparent electrode layer.

8. The display module with touch function of claim 2, wherein the cap is a transparent cover and the second pixel electrode layer is a transparent electrode layer.

9. The display module with touch function of claim 1, further comprising a circuit board, wherein the control chip is disposed on the circuit board and the circuit board is electrically connected to a plurality of conductive wires of the touch panel to have the control chip respectively connect to the passive matrix organic light emitting diode display device and the at least two second sensing electrodes.

10. The display module with touch function of claim 1, wherein the control chip is used to control the at least one first sensing electrode to be switched between a touch on mode and a display on mode.

11. The display module with touch function of claim 1, wherein the control chip is used to control the at least two second sensing electrodes to be switched between a touch on mode and a touch off mode.

* * * * *